(12) United States Patent
Lovberg et al.

(10) Patent No.: US 9,300,508 B2
(45) Date of Patent: Mar. 29, 2016

(54) HIGH DATA RATE MILLLIMETER WAVE RADIO ON A CHIP

(75) Inventors: John A. Lovberg, San Diego, CA (US); Richard Chedester, Whately, MA (US)

(73) Assignee: Trex Enterprises Corp., San Diego, CA (US)

(*) Notice: Subject to any disclaimer, the term of this patent is extended or adjusted under 35 U.S.C. 154(b) by 510 days.

(21) Appl. No.: 12/930,947

(22) Filed: Jan. 20, 2011

(65) Prior Publication Data

US 2011/0122932 A1  May 26, 2011

Related U.S. Application Data

(63) Continuation-in-part of application No. 12/228,114, filed on Aug. 7, 2008, now Pat. No. 8,098,764, and a continuation-in-part of application No. 12/928,017, filed on Nov. 30, 2010.

(51) Int. Cl.
*H04B 1/38* (2015.01)
*H04L 27/20* (2006.01)
*H04L 27/233* (2006.01)

(52) U.S. Cl.
CPC ........ *H04L 27/2039* (2013.01); *H04L 27/2332* (2013.01)

(58) Field of Classification Search
CPC .. H04L 27/2039; H04L 27/2332; H04L 27/22
See application file for complete search history.

(56) References Cited

U.S. PATENT DOCUMENTS

| | | | |
|---|---|---|---|
| 7,103,279 B1* | 9/2006 | Koh et al. | 398/115 |
| 2003/0152140 A1* | 8/2003 | Antoniak | 375/219 |
| 2005/0271125 A1* | 12/2005 | Chedester et al. | 375/219 |
| 2007/0196110 A1* | 8/2007 | Mikkelsen et al. | 398/140 |
| 2007/0285307 A1* | 12/2007 | Nishijima et al. | 342/200 |
| 2010/0034316 A1* | 2/2010 | Korevaar | 375/308 |
| 2010/0086081 A1* | 4/2010 | Fujita et al. | 375/300 |
| 2011/0081872 A1* | 4/2011 | Bar-Sade et al. | 455/77 |
| 2011/0206144 A1* | 8/2011 | Yamamoto et al. | 375/259 |
| 2015/0063495 A1* | 3/2015 | Qu et al. | 375/330 |

OTHER PUBLICATIONS

Nan Guo, Robert C. Qiu, Shaomin S.Mo and Kazuaki Takahashi, 60-GHzMillimeter-Wave Radio: Principle,Technology, and New Results, EURASIP Journal onWireless Communications and Networking, 2007.*
IBM, 60 GHz mm Wave SiGe Receiver (downloaded from the Internet), Apr. 22, 2010.
IBM, 69Ghz mm Wave SiGe Transmitter (downloaded from the Internet), Apr. 28, 2010.

* cited by examiner

*Primary Examiner* — Aristocratis Fotakis
(74) *Attorney, Agent, or Firm* — John R. Ross

(57) ABSTRACT

A millimeter wave radio transceiver having all or substantially all of its components fabricated on a single chip or chipset of a small number of semiconductor chips. The chip or chipsets when mass produced is expected to make the price of millimeter wave radios comparable to many of the lower-priced microwave radios available today from low-cost foreign suppliers. Transceivers of the present invention operate in the range of about 1 Gbps to more than 10 Gbps. The transceiver of a preferred embodiment is designed to receive binary input data at an input data rate in 10.3125 Gbps and to transmit at a transmit data rate in of 10.3125 Gbps utilizing encoded three-bit data symbols on a millimeter carrier wave at a millimeter wave nominal carrier frequency in excess of 70 GHz.

19 Claims, 12 Drawing Sheets

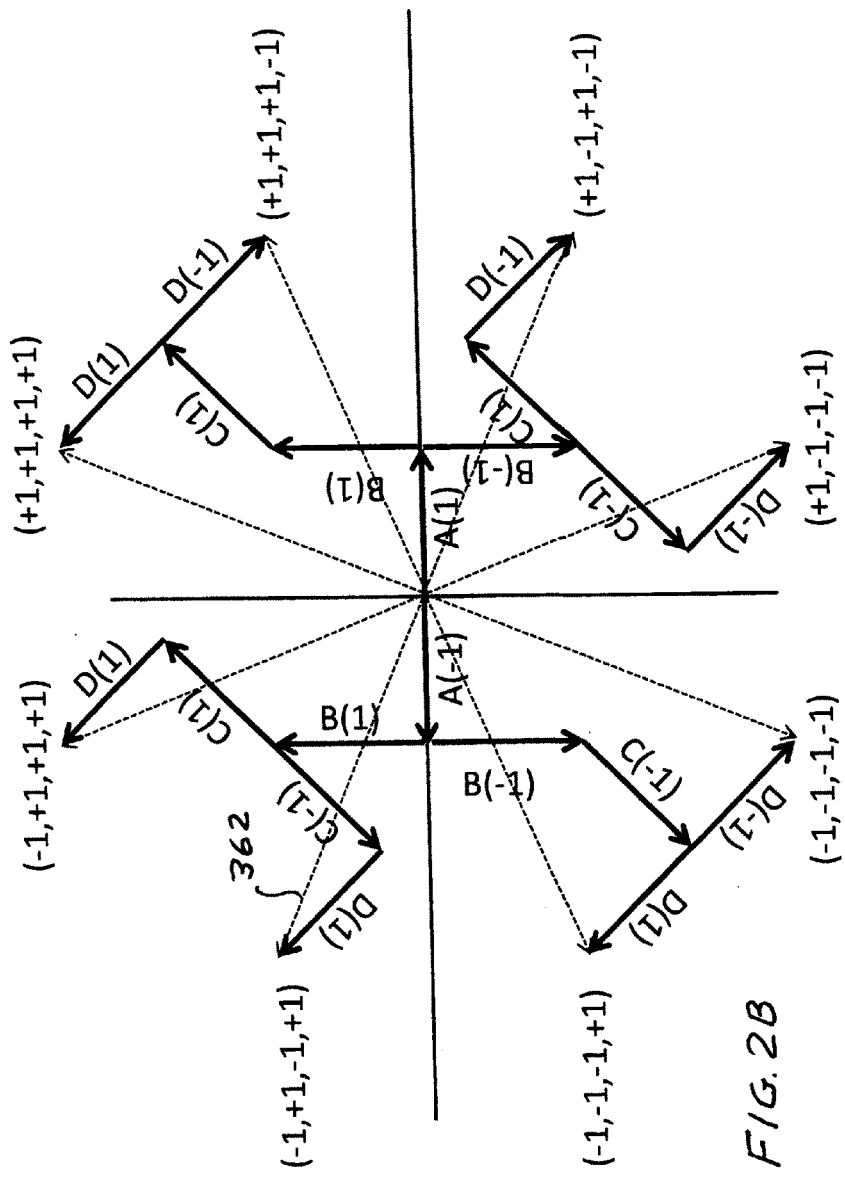

State Table

| Ctrl | Phase | A | B | C | D |
|------|-------|----|----|----|----|
| 000 | 67.5° | +1 | +1 | +1 | +1 |
| 001 | 112.5° | -1 | +1 | +1 | +1 |
| 010 | 157.5° | -1 | +1 | -1 | +1 |
| 011 | 202.5° | -1 | -1 | -1 | +1 |
| 100 | 247.5° | -1 | -1 | -1 | -1 |
| 101 | 292.5° | +1 | -1 | -1 | -1 |
| 110 | 337.5° | +1 | -1 | +1 | -1 |
| 111 | 22.5° | +1 | +1 | +1 | -1 |

- "D" mixer state is inverse of MSB (0 ⇒ non-inverting)
- "C" mixer state is inverted XOR of MSB and 2SB
- If LSB = 0:
  - Then $I_1 = I_2$ and $Q_1 = Q_2$ (A = C, B = D)
- But if LSB = 1:
  - Then if 2SB = 0, $I_1 = -I_2$ and $Q_1 = Q_2$
  - But if 2SB = 1, $I_1 = I_2$ and $Q_1 = -Q_2$

FIG. 5

HIGH DATA RATE MILLLIMETER WAVE RADIO ON A CHIP

CROSS REFERENCE TO RELATED APPLICATIONS

This application is a continuation in part of U.S. patent application Ser. No. 12/228,114, filed Aug. 7, 2008 now U.S. Pat. No. 8,098,764 and Ser. No. 12/928,017 filed Nov. 30, 2010 which are incorporated herein by reference.

FIELD OF THE INVENTION

The present invention relates to radio systems and in particular to radios having a large number of components fabricated on a single or small number of semiconductor chips.

BACKGROUND OF THE INVENTION

Millimeter Wave Radios

In January of 2003, the United States Federal Communications Commission (with encouragement from Applicants' employer and others) affected a new rulemaking in which 10 GHz of bandwidth, comprising (E-Band) frequency channels spanning the extremely high frequency bands from 71 to 76 gigahertz (GHz) and 81 to 86 GHz. These bands were opened for short range, high bandwidth, point-to-point radio communications without restrictions on modulation efficiency. The unique characteristic of this rulemaking was that for the first time a large section of bandwidth would be shared based on geographical (antenna beamwidth) constraints rather than spectral (channelizing) constraints. Each user of the new frequency bands was free to use the entire available bandwidth (5 GHz in each of two bands) as long as the transmit/receive path was confined within a single very narrow channel ("pencil beam" less than 1.2 degrees wide) in 3-dimensional space. However, rain fade at E Band can reach up to 35 dB/km, versus 1 dB/km at 6 GHz, so much larger link margins must be maintained at E Band, relative to lower frequency microwave bands, to accommodate severe weather events. On the other hand, the 5 GHz channel bandwidths available at E-Band are more than twenty times as wide as the widest channels available at microwave frequencies, so data rates in the range of 1 Gbps (unheard of for microwave radios) are made possible using simple on-off keying or binary phase-shift keying.

Applicants' employer led the way in the development of the early millimeter wave radios. Several patents describing these early radios have been awarded to Applicants and their fellow workers and assigned to Applicants' employer. These patents include the following patents all of which are incorporated herein by reference:

Quadrature Amplitude Modulation

Two key conditions dictated early microwave radio designs for fixed point-to-point communications: 1) very limited available bandwidth in which to transmit as much data as possible, and 2) minimal dynamic range variation associated with rain fade and other weather or atmospheric variations. The first of these conditions dictated the adoption of very high-order modulation techniques such as quadrature amplitude modulation (QAM). For example, 64-QAM, 128-QAM, or 256-QAM systems are in use for microwave links in which several (such as 6 to 8) digital bits can be sent simultaneously using a single pseudo-digital symbol, thereby increasing spectral throughput (bits per second per Hertz), but using such modulation schemes, a penalty of 17 to 22 dB in transmitter power is incurred relative to single-bit symbol modulation (on-off keying or binary phase shift keying) to maintain a manageable bit error rate. The second key condition driving earlier designs, the comparatively lower atmospheric attenuation and weather fade characteristic of lower frequencies, made such modulation efficiency trades desirable for microwave radios, by requiring little additional link margin to cope with high humidity and heavy rainfall. These QAM techniques work well on microwave systems, but have not been successfully applied to millimeter wave communication systems designed for longer propagation paths (e.g. exceeding a kilometer).

Modulation Using Phase Shift Keying

Phase shift keying is a digital modulation scheme that conveys information by changing, or modulating, the phase of a reference signal. Usually, each phase encodes an equal number of bits. Each pattern of bits forms a symbol that is represented by the particular phase. A demodulator designed specifically for the symbol-set used by the modulator determines the phase of the received signal and maps it back to the symbol it represents, thus recovering the original data. This requires the receiver to be able to compare the phase of the received signal to a reference signal. Alternatively, instead of using the data bit pattern to set the absolute phase of the wave, it can instead be used to change the phase by a specified amount. The demodulator then determines the change in the phase of the received signal rather than the phase itself. Since this scheme depends on the difference between successive phases, it is termed differential phase-shift keying (DPSK). Differential phase shift keying can be significantly simpler to implement than ordinary phase shift keying since there is no need for the demodulator to have a copy of the reference signal to determine the exact phase of the received signal.

| PAT. NO. | ISSUED | TITLE |
| --- | --- | --- |
| U.S. Pat. No. 6,556,836 | Apr. 29, 2003 | Point to Point Millimeter Wave Dual Band Free Space Gigabit per Second Communication Link |
| U.S. Pat. No. 6,665,546 | Dec. 16, 2003 | High Speed Point-to-Point Millimeter Wave Data Communication System |
| U.S. Pat. No. 6,714,800 | Mar. 30, 2004 | Cellular Telephone System with Free Space Millimeter Wave Trunk Line |
| U.S. Pat. No. 7,062,283 | Jun. 13, 2006 | Cellular Telephone System with Free Space Millimeter Wave Trunk Line |
| U.S. Pat. No. 7,065,326 | Jun. 20, 2006 | Millimeter Wave Communication System with a High Performance Modular Circuit |
| U.S. Pat. No. 7,680,516 | Mar. 16, 2010 | Mobile Millimeter Wave Communication Link |
| U.S. Pat. No. 7,769,347 | Aug. 3, 2010 | Wireless Communication System |

Costas Loops

A Costas loop is a phase locked loop used for carrier phase recovery from carrier modulation signals, such as from double-sideband suppressed carrier signals. It was invented by in the 1950s. The primary application of Costas loops is in wireless receivers. Its advantage over other similar phase detectors is that at small phase deviations the Costas loop error voltage is larger. This translates to higher sensitivity.

Last Mile and Middle Mile Communication Services

The United States and many other countries are crisscrossed by many thousands of miles of fiber optic communications links providing almost unlimited communication between major population centers. Telephone companies provide communications services to nearly all of the homes and offices in the United States and many other countries, but existing telephone services in many areas provide only low speed (i.e. low data rate) connections. Communication companies are rapidly improving these last mile services with cable and fiber optic connections, but these improvements are slow and expensive and a large number of people are still without access to high speed communication services. Microwave radios have been used for many years for last mile and middle mile communication services, but bandwidths for these systems are typically limited such that data rates available are typically much less than 1 Gbps. Communication companies are beginning to utilize millimeter wave radios to provide these services but the data rates of most of these radios, although much greater than the microwave systems, are currently limited to about 1 Gbps. Many cellular systems are becoming overloaded due to the increased bandwidth required by the iPhone 4 and similar "smart" phone and other consumer products and prior art backhaul facilities are fast becoming inadequate. Updating these systems is expensive.

High Data Rate Protocols

A popular communication protocol which is being increasingly utilized to meet this demand for increased bandwidth is the Internet Protocol (IP) 10 GbE Ethernet Standard at 10 Gigabits per second, with a small amount of overhead for ensuring carrier modulation (bit toggling) at some minimum speed. There are, however, many current wired and fiber communications standards that use transceivers for serial transfer of binary data at speeds in excess of 4 Gigabits per second. Some of these include: SONET OC-96 (4.976 Gbps); 4xGig-E (5.00 Gbps); 5xGig-E (6.25 Gbps); OBSAI RP3-01 (6.144 Gbps); 6xGig-E (7.50 Gbps); Fibre Channel 8GFC (8.5 Gbps); SONET OC-192 (9.952 Gbps) and Fibre Channel 10GFC Serial (10.52 Gbps).

Semiconductor Technology

Recent advances in semiconductor technology have enabled the fabrication of increasingly complex mixed-signal (analog/digital) circuitry on a single integrated circuit chip or a chipset containing a minimal number of chips. Such circuitry has included analog microwave and millimeter-wave front-end amplifiers, filters, oscillators, and mixer/down-converters, as well as intermediate-frequency electronics, phase-lock loops, power control and back-end analog baseband circuitry, along with digital modulators and de-modulators, clock recovery circuits, forward error correction and other digital data management functions. Mixed-signal integrated chip solutions for wireless communications have universally evolved from RF frequencies below 1 GHz (e.g. 900 MHz handsets for wireless telephone in the home) to low microwave frequencies (analog/digital cell phone technology with carrier frequencies up to 2 GHz), to high microwave and low millimeter-wave frequencies (6 to 38 GHz) for wireless point-to-point broadband communications. Most recently, radio receivers and transmitters have been demonstrated using single-chip circuits at frequencies in the license-free band spanning 57 to 64 GHz. These circuits have been based on techniques that have been successful to lower frequency radios. For example, these prior art radio-on-a-chip designs have featured heterodyne and super-heterodyne circuits with relatively narrow (<1 GHz) baseband frequency channels for modulation and demodulation, because the symbol rate was constrained far below 1 billion symbols per second by the channel bandwidth available for microwave radios. A chip refers to a group of integrated circuits on a single substrate and a chipset refers to a set of chips that are designed to work together. Chipsets are usually marketed as a single product.

The Need

What is needed is a millimeter wave radio on a chip designed appropriately to deal with the added complexities associated with these higher frequencies, and at the same time configured to take advantage of the much higher bandwidth available in the frequency ranges above 70 GHz.

SUMMARY OF THE INVENTION

High Data Rate Millimeter Wave Radio on a Chip

The present invention provides a high data rate millimeter wave radio transceiver having all or substantially all of its components fabricated on a single chip or a chipset of a small number of semiconductor chips. The chips or chipsets when mass produced are expected to make the price of millimeter wave radios comparable to many of the lower-priced microwave radios available today from low-cost foreign suppliers. Applicants' radios operate in frequency ranges where bandwidths greater than 1 GHz are available, such as the license free range from 57-64 GHz and the licensed range from 71-76 GHz and 81-86 GHz. Embodiments of the present invention are designed to utilize the entire available bandwidth, greater than 1 GHz, for modulation and demodulation. Optimal designs for Applicants' radio chips will utilize baseband modulation bandwidths of 1 to 5 GHz permitting occupation of up to 5 GHz of contiguous spectrum per half-duplex radio path. Transceivers of the present invention operate at data rates in the range of about 1 Gbps to more than 10 Gbps. The transceiver of a preferred embodiment is designed to receive binary input data at an input data rate in 10.3125 Gbps and to transmit at a transmit data rate in of 10.3125 Gbps utilizing encoded three-bit data symbols on a millimeter carrier wave at a millimeter wave nominal carrier frequency in excess of 50 GHz. The radio uses differential phase-shift keying utilizing eight separate phase shifts. This embodiment of the invention can be used to support many of the high data rate standards including the following group of protocols or standards: SONET OC-96 (4.976 Gbps); 4xGig-E (5.00 Gbps); 5xGig-E (6.25 Gbps); OBSAI RP3-01 (6.144 Gbps); 6xGig-E (7.50 Gbps); Fibre Channel 8GFC (8.5 Gbps); SONET OC-192 (9.952 Gbps); 10GigE (10.3125 Gbps) and Fibre Channel 10GFC Serial (10.52 Gbps).

A 10 Gigabit Per Second Millimeter Wave Radio

Preferred embodiments of the present invention include a 10-gigabits-per-second radio transceiver operating with carrier signals in the frequency ranges of 71-76 GHz and 81-86 GHz. This transceiver includes a transmitter transmitting in the 71-76 GHz band and a receiver receiving in the 81-86 GHz band, or a transmitter transmitting in the 81-86 GHz band and a receiver receiving in the 71-76 GHz band. Two of these transceivers constitute a millimeter-wave radio link designed to operate in accordance with the 10 Gigabit Ethernet standard (which is also referred to as 10 GE, 10 GbE and 10 GigE). In preferred embodiments all of the components of the transceiver are fabricated on a single chip or chipset except the antenna systems, diplexers, delay lines, frequency generators, power amplifiers and voltage regulators.

In these preferred embodiments the transmitter for each transceiver supports a digital data rate of 10.3125 Gbps (10 Gigabits raw data per second plus IEEE 802.3 Clause 49 64b/66b encoding which accounts for the 0.3125 Gbps excess), using 3-bit symbol encoding (e.g. 8PSK). The carrier phase is modulated at a symbol rate of 3.4375 billion-symbols-per-second, so as to fit easily into the 5 GHz channel modulation bandwidth allowed by the prevailing FCC band plan for E-Band communication. During each (approximately 291 ps) symbol period, 3 bits of data are clocked into a temporary data buffer and then loaded onto three parallel data lines to form a most-significant-bit (MSB), a second-most-significant-bit (2SB) and a least-significant-bit (LSB) in a phase modulator. A nearly-instantaneous phase shift is imposed onto the transmitted carrier signal, each shift representing a specific digital symbol. This phase shift comprises one of eight standard phase shifts, with the degree of shift depending on the states of the three data lines. In a preferred embodiment the phase shift is either 0°, 45°, 90°, 135°, 180°, 225°, 270° or 315°. In this preferred embodiment each of these phase shifts respectively represent a symbol consisting of a combination of binary bits, 000 to 111, as shown in the following table:

| | |
|---|---|
| 0° | 000 |
| 45° | 001 |
| 90° | 010 |
| 135° | 011 |
| 180° | 100 |
| 225° | 101 |
| 270° | 110 |
| 315° | 111 |

In the preferred embodiments the receiver in each transceiver includes a demodulator with a sequential state phase comparator that detects and evaluates the received signal to reconstruct the three data bits from each symbol.

The transmitter in this preferred embodiment includes a frequency stabilized millimeter wave source operating at the millimeter wave carrier frequency; an encoder having an output clocked at the on-off keyed input data rate divided by three and adapted to generate sets of four phase shift modulator control bits, each set representing one of eight three-bit symbols; and a modulator adapted to apply each set of four phase shift modulator control bits from the output of the encoder to the millimeter carrier wave in the form of a single phase shift for each three-bit symbol, each phase shift being one of eight standard, recognizably distinct phase shifts. The receiver is adapted to receive an incoming millimeter wave signal transmitted from a remote millimeter wave transmitter transmitting at frequencies in excess of 70 GHz and to reconstruct communications data sent from the remote transmitter. The receiver of this preferred embodiment includes a millimeter wave amplifier adapted to amplify said incoming millimeter wave signal and a demodulator adapted to decode the incoming millimeter wave signal to produce a binary output data stream at an output data rate of 10.3125 Gbps.

Other embodiments of the present invention include millimeter wave radios operating at data rates lower than about 10 Gbps. For radios operating at data rates much lower than about 10 Gbps, other modulation schemes are preferred. For example, for data rates between about 1.25 Gbps to about 3.5 Gbps a Differential Binary Phase Shift Keying (DBPSK) modulation scheme is preferred. For data rates between about 3.5 GBPS to about 7 Gbps a Differential Quadrature Phase Shift Keying (DQPSK) modulation scheme is preferred.

In preferred embodiments operating at data rates in the range of about 3.5 Gbps the occupied transmit bandwidth is preferably between 1.0 GHz and 5 GHz. For data rates of the 10 GigE transceiver the occupied transmit bandwidth is preferably between 3.5 GHz and 5 GHz. Preferably the power spectrum density within more than 70 percent of the output power of the transmitter is constant to within +/−1.5 dB and the transceiver provides provide a dynamic range in power output exceeding 15 dB.

BRIEF DESCRIPTION OF THE DRAWINGS

FIGS. 2A and 2B are drawings showing features of a modulator for a first preferred embodiment of the present invention.

FIG. 5 is a state table applicable to a preferred embodiment.

DETAILED DESCRIPTION OF PREFERRED EMBODIMENTS

Circuit Methodologies

Figure 1A:
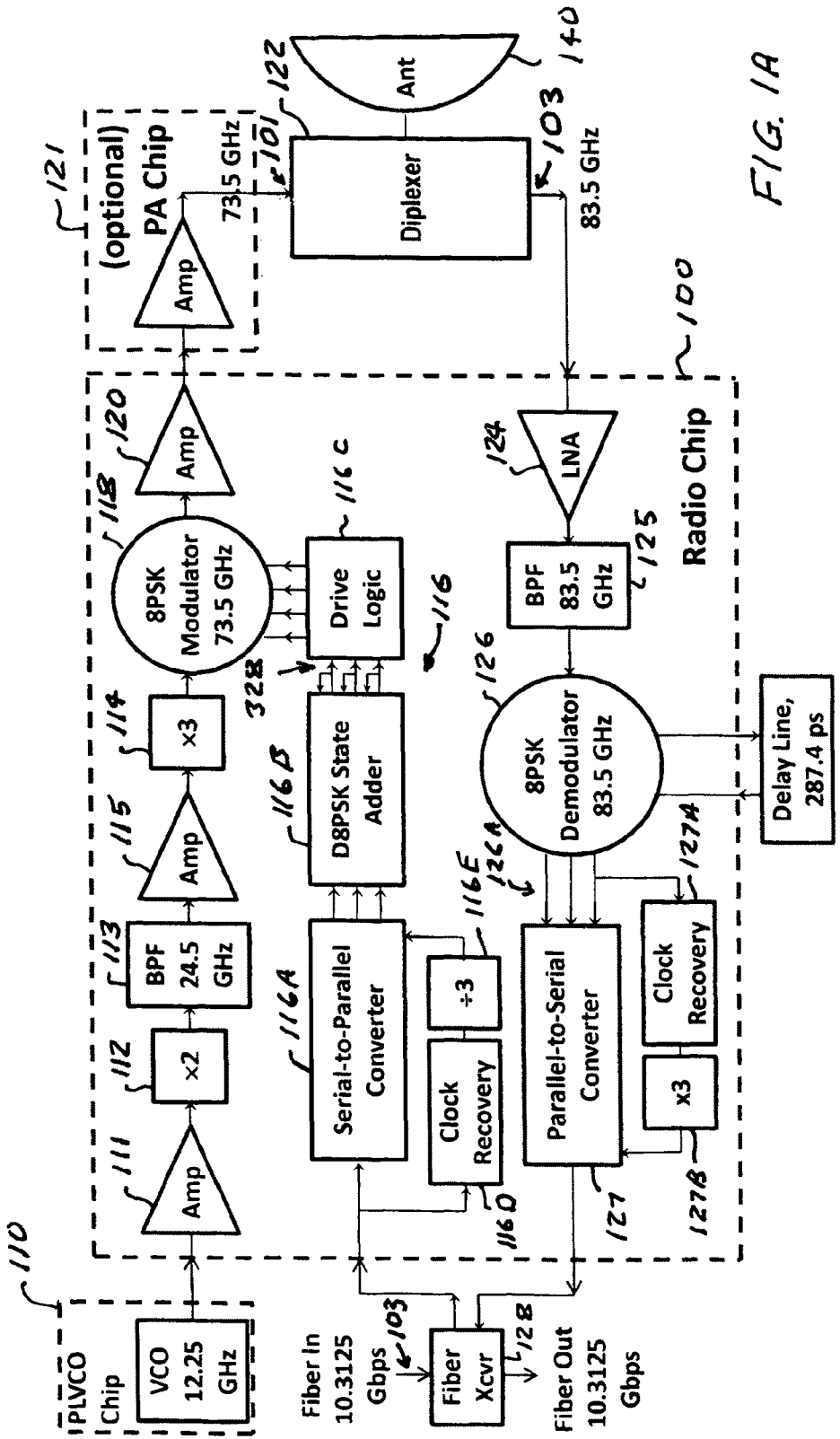
FIGS. 1A and 1B show features to two radios for a preferred embodiment of a 10.3125 Gbps millimeter radio link.

As radio technology has evolved from low frequencies to higher and higher frequencies, the circuit methodologies optimized for the physical and practical constraints of lower-frequency communications were continually applied to higher frequency applications. This was done without consideration for differences in the physical and practical constraints characteristic of high frequency communications. As a result, previous attempts at delivering single-chip and minimal chipset solutions for frequencies above 64 GHz have not been successful at producing commercially viable radios.

Two key conditions dictated early (lower frequency) chip designs for fixed point-to-point communications: 1) very limited available bandwidth in which to transmit as much data as possible, and 2) minimal dynamic range variation associated with rain fade and other weather or atmospheric variations. The first of these conditions dictated the adoption of very high-order modulation techniques such as 64-, 128-, or 256-CLAM, in which several (6 to 8) digital bits could be sent simultaneously using a single pseudo-digital symbol, thereby increasing spectral throughput (bits per second per Hertz). The high-order modulation results in a penalty of 17 to 22 dB in transmitter power relative to single-bit symbol modulation (on-off keying or binary phase shift keying) to maintain a manageable bit error rate. The second key condition, the comparatively lower atmospheric attenuation and weather fade characteristic of lower frequencies, made such modulation efficiency trades desirable for microwave radios, by requiring little additional signal to noise link margin to cope with high humidity and heavy rainfall.

Silicon-Germanium Semiconductors

Silicon-germanium bipolar transistors on complementary metal-oxide-semiconductor (referred to as "SiGe BiCMOS") technology, which marries the superior low-noise and high-speed properties of the SiGe heterojunction bipolar transistors with the low cost and manufacturability advantages of conventional CMOS technology, represent an ideal solution for mixed-signal applications such as millimeter-wave wireless communications systems, in which frequency sources and multipliers, mixers and low-noise amplifiers are used alongside digital modulator control and processing circuitry. Amplifiers using SiGe bipolar transistors are more efficient and achieve lower noise figures than comparable conventional CMOS amplifiers, and the higher breakdown voltage of SiGe allows for higher device output power as well.

High Frequency Radio Components on Si and SiGe

Gallium Arsenide (GaAs) is superior to SiGe semiconductors for ultra-low phase noise high-frequency oscillators (so an external microwave phase-locked voltage-controlled oscillator (PLVCO) is a preferred frequency source), but the frequency multiplier chain, up-conversion and down-conversion mixers and millimeter-wave, microwave and baseband amplifiers can all be implemented satisfactorily using conventional microstrip circuitry on Si and SiGe semiconductor substrates. For lowest cost, a silicon wafer can be used as a substrate, with germanium placed locally on the chip at the locations of the millimeter-wave transistors and diodes, so that the SiGe material is localized only in the regions of the high-frequency MMW and microwave semiconductor junctions. Lower frequency circuitry, including the data encoder, high-speed driving logic and all other baseband and digital data and control electronics are implemented using standard CMOS processes on the same silicon substrate. The data decoder and delay-stabilizing Costas loop can be implemented on the receiver chip, but due to its physical size the longer symbol-period delay line is best implemented off-chip, using a microstrip line on a flex-circuit material such as Rogers 3003 or using a waveguide delay line. A SiGe foundry, such as the IBM foundry located near Essex Junction, Vt., with a 0.13-micron or 0.09-micron SiGe process can produce SiGe chips of the preferred design for 10 Gbps E-Band radio transceivers.

Chip Design

Prior radio-on-a-chip designs have universally featured heterodyne and super-heterodyne circuits with relatively narrow (<1 GHz) baseband frequency channels for modulation and demodulation, because the symbol rate was constrained far below 1 billion symbols per second by the channel bandwidth available for microwave radios. Optimal designs for E-Band radio chips will utilize baseband modulation bandwidths of 1 to 5 GHz to make use of the preferential E-Band rules allowing occupation of up to 5 GHz of contiguous spectrum per half-duplex radio path.

First Preferred Embodiment

Applicants' 10-GigE Radio

A first preferred embodiment of the present invention satisfying the needs outlined above is a 10-GigE radio. The radio is based on and is a substantial improvement of the basic circuit design of a 3.072 Gbps radio described in the parent application, of which the present application is a continuation in part. That application is U.S. patent application Ser. No. 12/228,114, filed Aug. 7, 2008, Millimeter Wave Radio with Phase Modulation, which is incorporated herein by reference. This parent radio utilized radio circuitry as specifically described in FIG. 3 of the above patent which is reproduced in this application as FIG. 7.

To support a digital data rate of 10.3125 Gbps (10 Gigabits raw data per second plus IEEE 802.3 Clause 49 64b/66b encoding which accounts for the excess 0.3125 Gbps), the radio uses 3-bit symbol encoding and has its carrier modulated at a symbol rate of 3.4375 Giga-symbols-per-second so as to fit into the 5 GHz channel modulation bandwidth allowed by the prevailing FCC band plan for E-Band communication. The product of the 3.4375 billion symbols per second and the 3 bits per symbol results in the above digital data rate of 10.3125 billion bits per second.

In preferred embodiments the millimeter wave chipset radios are marketed as a pair of radios making a 10-GigE millimeter radio link supporting nominal data rates of about 10 Gbps. Details showing the important electronic components are described by reference to FIGS. 1A and 1B. One of the radios, Radio A, transmits at an average frequency of 73.5 GHz with a permitted total bandwidth of 5 GHz and receives at an average frequency of 83.5 GHz, and the other radio, Radio B, transmits at an average frequency of 83.5 GHz with a permitted total bandwidth of 5 GHz and receives at an average frequency of 73.5 GHz. Components of Radio A are identified with reference numbers between 100 and 140 and components of Radio B are identified with reference numbers between 200 and 240. Most of the components of each radio are fabricated on a single semiconductor substrate to provide radio chip 100 for Radio A and radio chip 200 for Radio B.

Transmitter Circuits

Figure 1B:
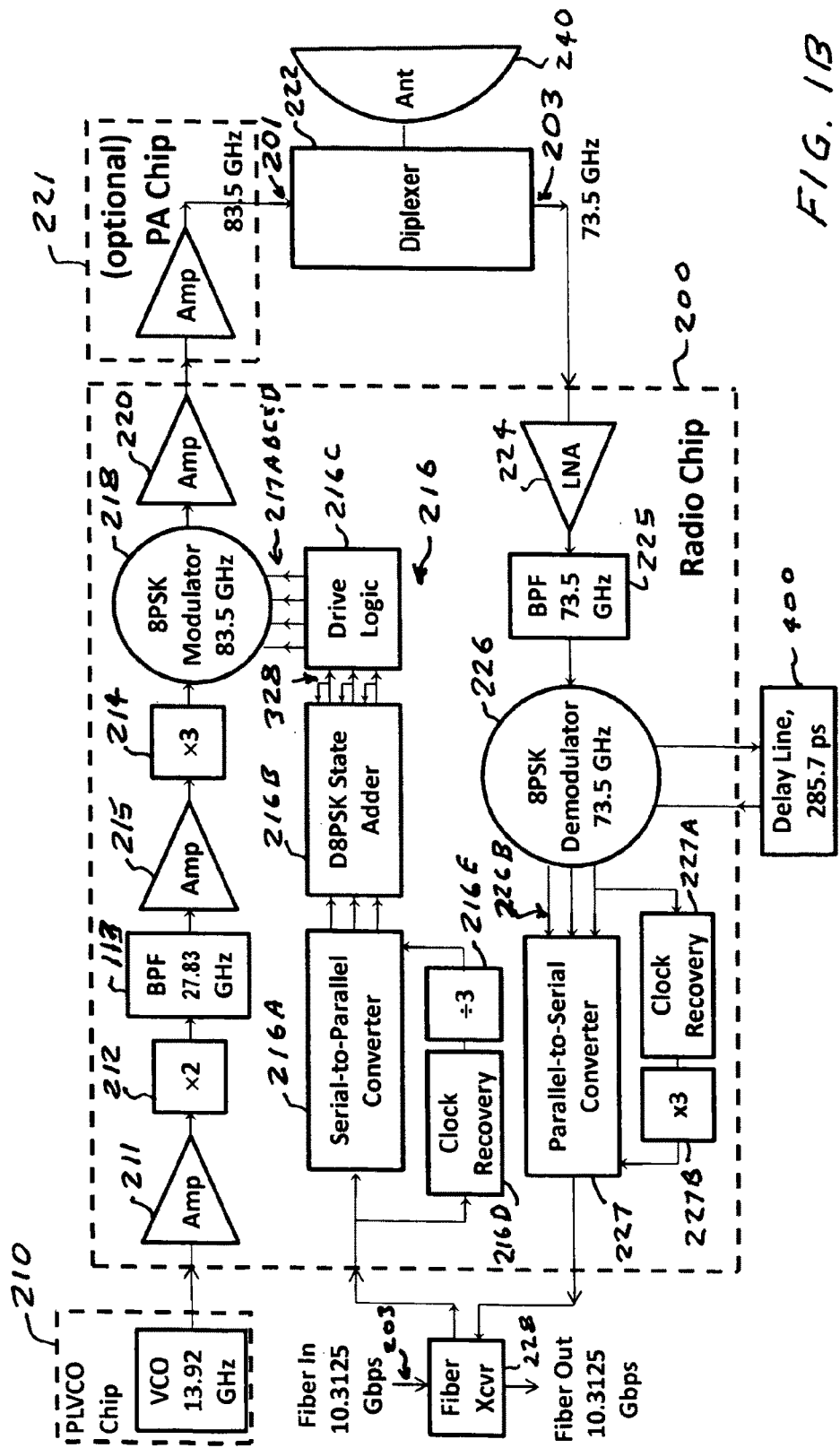

As shown at 103 and 203 in FIGS. 1A and 1B input to the radios is a fiber optical signal at 10.3125 Gbps. These signals are converted from on-off optical to on off electrical in fiber converter 128 and 228. The output on-off electrical signal at 10.3125 Gbps is directed to encoder circuitry 116 and 216 which utilizes this electrical signal to produce drive signals to modulate 73.5 GHz and 83.5 GHz signals generated in the transmitter portion of the radio transmitter circuitry. The encoder circuitry is described in detail in a following section.

As shown in FIGS. 1A and 1B a microwave signal is generated off chip, using phase-locked voltage controlled oscillators 110 and 210, chosen for very low phase noise. These oscillators, such as Hittite Part Number HMC783 and Part Number HMC807, are locked (at 12.25 GHz for Radio A and 13.92 GHz for Radio B respectively) to a crystal reference. These microwave signals are amplified in on-chip amplifiers 111 and 211, frequency doubled to 24.5 GHz and 27.83 GHz (in multipliers 112 and 212) filtered in filters 113 and 213, amplified in amplifiers 115 and 215, and then frequency tripled in times-three frequency multipliers 114 and 214 (to frequencies of 73.5 GHz and 83.5 GHz respectively), to produce carrier frequencies preferably approximately centered in the 71-76 band (73.5 GHz for Radio A) and 81-86 GHz band (83.5 GHz for Radio B), with resulting integrated RF phase noise of less 5 degrees. This signal passes to the phase-shift keyed modulators 118 and 218 and on to a power amplifier 120 and 220, for output to the antenna diplexer 122 for Radio A and diplexer 222 for Radio B. Key improvements over the radio of the parent application and the earlier prior art is encompassed in modulators 118 and 218 and are described below with reference to FIG. 2A through 2C.

The transmitter power amplifier 120 and 220 includes at least 15 dB of power adjustment by way of a control voltage to the transmitter power amplifiers 120 and 220, designed to compensate for rain fade by way of an in-band or out-of-band handshake communication of power margin with a remote receiver. The full amplifier chain is designed to provide less than 3 dB of gain variation across the full (approximately 4 GHz) operating bandwidth of the transmitter. The power amplifiers 120 and 220 are designed for high efficiency and their saturation power will not typically exceed 200 milliwatts. Any requirement for higher output power can be accommodated by a separate external amplifier 121 and 221 between the transceiver chip and the diplexer.

Modulation of the Transmit Carrier Signal

D8PSK Modulator

Figure 2A:
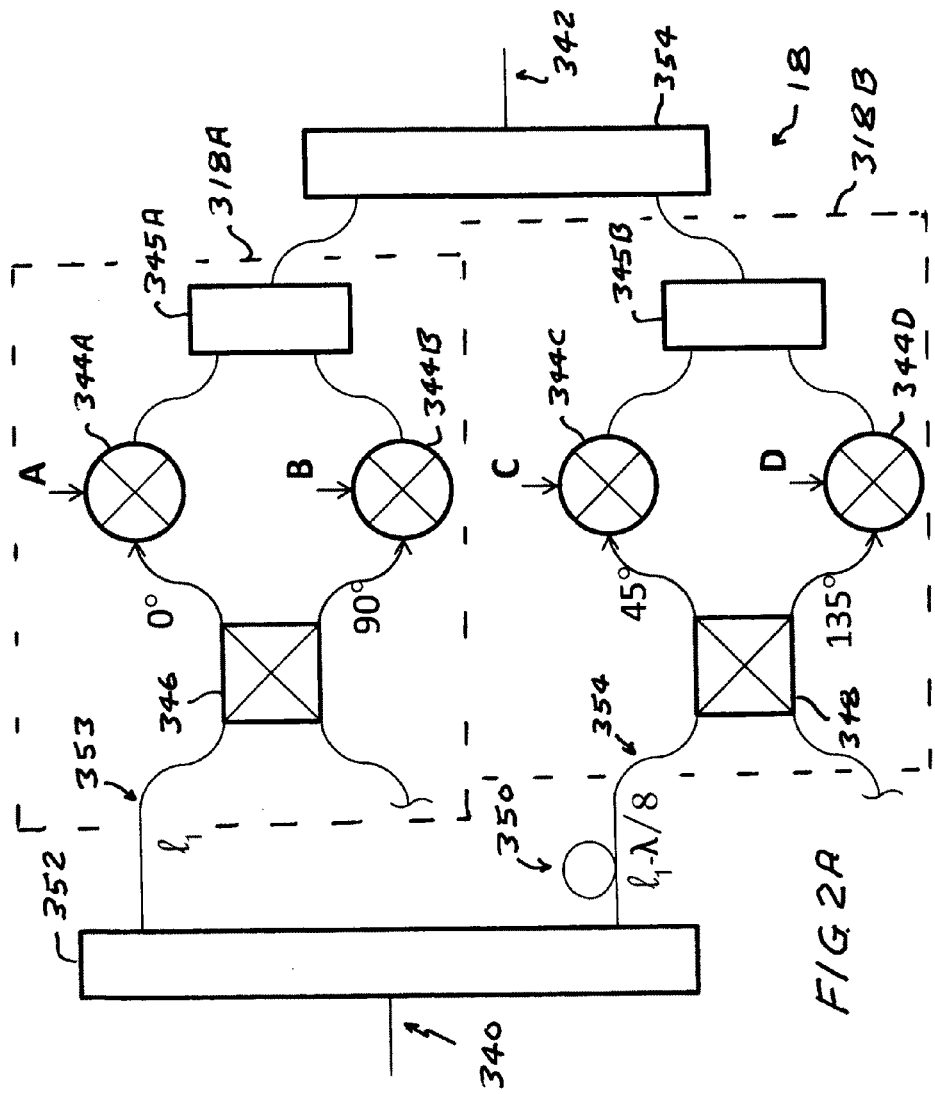

Important components of modulators 118 and 218 are shown at 18 in FIG. 2A for a preferred modulator design. This modulator supports a digital data rate of 10.3125 Gbps (10 Gigabits raw data per second plus IEEE 802.3 Clause 49 64b/66b encoding), using 3-bit symbol encoding (e.g. 8PSK) to modulate the carrier signals at a symbol rate of 3.4375 Giga-symbols-per-second (so as to fit into the 5 GHz channel modulation bandwidth allowed by the prevailing FCC band plan for E-Band radios). Modulator 18 includes input signal splitter 352, output signal combiner 354, 45-degree phase delay line 350, and two IQ modulators circuits 318A and 318B. The IQ modulator circuits are similar to those in Goteborg Microwave Integrated Circuits model MDR080A01, incorporate 90-degree hybrid splitters 346 and 348, phase conserving/inverting mixers 344A, 344B, 344C and 344D, and combiners 345A and 345B. Splitter 352 divides the input signal into two equal signals a reference signal in line 353 and a second signal in line 354. The signal in line 354 is phase shifted by 45 degrees by delay line 350. In IQ modulator 318B this signal is then split through 90-degree hybrid 348 into two parts which are phase shifted respectively by a total of 45 degrees and 135 degrees relative to the initial reference signal, and these signals are passed through two driver-controlled switchable phase inverters before being recombined at 345B. In IQ modulator 318A, the reference signal is split into two parts by 90-degree hybrid 346, one part of which is not phase shifted and the other part of which is phase shifted 90 degrees, and then passed through two driver-controlled switchable phase inverters before being recombined at 345A. The signals from IQ modulator circuits 318A and 318B are then further combined in combiner 354 to form an 8PSK-modulated waveform.

In this preferred embodiment modulator 18 (referring to modulators 118 and 218) is controlled to shift the phase of the carrier signal (either 73.5 GHz or 83.5 GHz) at approximately 291 ps intervals (a rate of 3.4375 billion shifts per second) by four phase control bits 217A, B, C and D generated in encoder circuitry shown at 116 and 216 (A through E) in FIGS. 1A and 1B. The amount of shift is one of the following: 0°, 45°, 90°, 135°, 180°, 225°, 270° or 315°. The carrier signal enters modulator 18 as shown at 340 in FIG. 2A with an incoming phase and exits the modulator as shown at 342 with an exit phase. The shifts are imposed on the 73.5 GHz or 83.5 GHz carrier signal with the 8PSK modulator shown in FIG. 2A using drive signals A, B, C and D as shown in FIG. 2A. The logic state of each of drivers is either +1 or −1; the preferred IQ modulators use differential line pairs to deliver these drive states to the mixers. Simple drivers at A, B, C, and D output signals with positive polarity, which causes the mixers 344A, 344B, 344C and 344D to preserve signal polarity, or signals with negative polarity, causing the mixers to invert signal polarity.

Encoders

Figure 3:
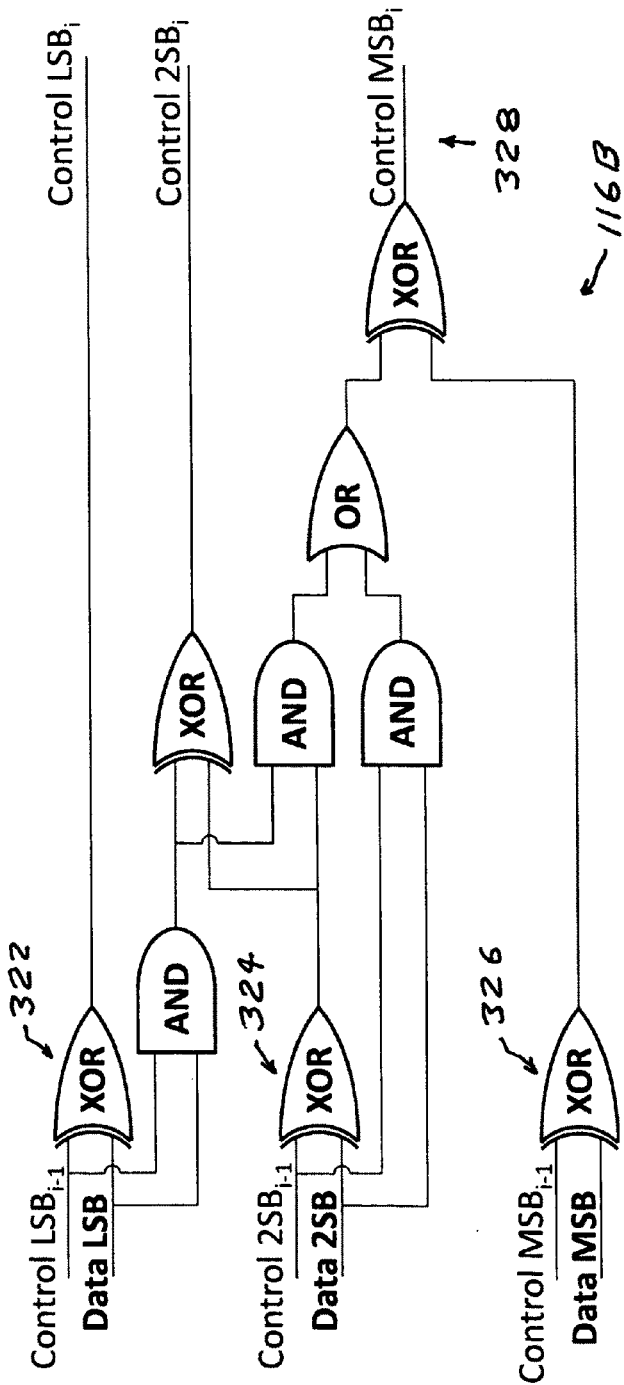
FIG. 3 shows important components of a D8PSK state adder.
Figure 4:
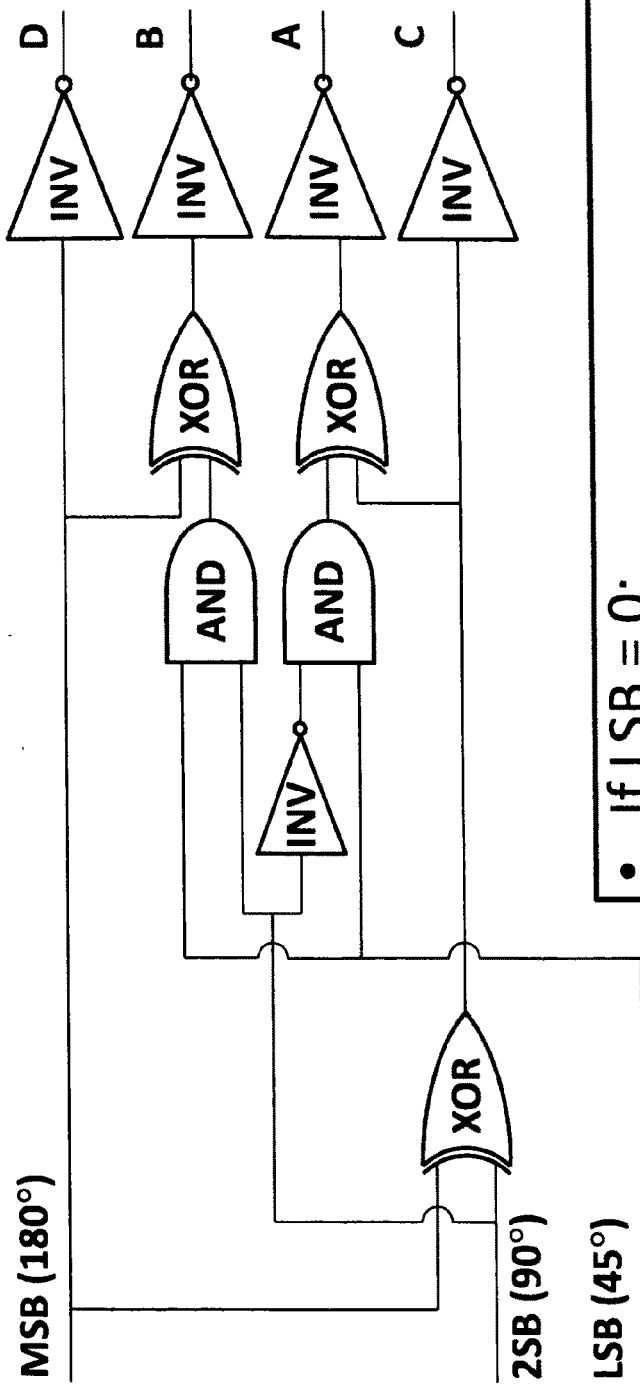
FIG. 4 describes drive logic for a preferred embodiment of the present invention.

FIGS. 3, 4 and 5 explains how phase control bits are encoded in encoders 116 and 216 (shown in FIGS. 1A and 1B) onto the 73.5 GHz and the 83.5 GHz carrier signals once each 291 ps, in the form of a single phase shift selected from one of the eight recognizably distinct phases listed in the State Table in FIG. 5. In the encoders, data are clocked by clock recovery circuits 116D and 216D and clock divider circuits 116E and 216E reducing the clock rate by a factor of three. The digital signal at the 10-Gigabit-Ethernet rate of 10.3125 Gbps is fed into a 3-bit temporary buffer, and then transferred simultaneously to a D8PSK state adder circuit 116B and 216B as a three-bit symbol at 3.4375 (equal to 10.3125 divided by 3) billion symbols per second onto three parallel data lines, identified as a most-significant bit (Data MSB), second-most-significant bit (Data 2SB), and least-significant bit (Data LSB). FIG. 3 describes the D8PSK state adder circuits. There the signals are used to compute a three-bit control word to feed the drive logic circuits which in turn drives the D8PSK modulators 118 and 218 as shown in FIGS. 1A and 1B and FIG. 2A.

Phase control bits are generated using a summing circuit in each of encoders 116 and 216 shown in FIGS. 1A and 1B. Each of these summing circuits is referred to as D8PSK state adder circuits as is shown in FIG. 3. This summing circuit is used to generate eight phase shift keyed modulator control bits from the 10-GigE data stream 103 and 203 received by the receive encoders 116 and 216 as shown in FIGS. 1A and 1B. In this summing circuit the current data least significant bit (Data $LSB_{i-1}$) is added to the control least significant bit (Control LSB) from the prior (291 ps earlier) symbol of three bits, as shown at 322 in FIG. 3. The same is done for the second significant bit and the most significant bit as shown at 324 and 326 utilizing XOR, AND, and OR logic circuits, also as shown in FIG. 3. The carry bit from the sum of the most significant bits is truncated. The result is the creation of current Control $LSB_i$, Control $2SB_i$, and Control $MSB_i$ as shown at 328 in FIG. 3 and FIGS. 1A and 1B. Thus, the input to the summing circuit is the three-bit phase change instruction data as shown in FIG. 3 and the output is the three-bit absolute phase control instruction.

Drive Logic

The State Table in FIG. 5 provides eight phase control bit patterns, 000, 001, 010, 011, 100, 101, 110 and 111, and eight sets of corresponding modulator inputs for each of the four modulator drive signals, A, B, C and D, for the 8PSK transmitter modulator 18 shown in detail in FIG. 2A. As described previously, the phase control bits shown in the State Table do not represent the data stream itself, but rather the sum of the three current data bits added to the prior phase control bits and truncated to the three least significant bits and discarding any fourth bit. As such the transmitted data is encoded into the phase shift rather than the phase, so that no absolute phase calibration is necessary at the remote receiver. The IQ modulator inputs A, B, C, and D are encoded by drive logic circuitry 116C and 216C as shown in FIGS. 1A and 1B. These circuits use XOR, AND, and inverter logic circuits as shown in FIG. 4. The 8PSK modulator drive logic, generates drive signals A, B, C and D for the IQ modulators 218A and 318B shown in FIG. 2A. The drive signals are according to the phase encoding plan shown in the State Table in FIG. 5. Simple drivers at the output generate positive polarity, causing the mixers 344A, B, C and D to preserve signal polarity, for a logic state of +1 as shown in the State Table in FIG. 5, or generate negative polarity, causing the mixers to invert signal polarity for a logic state of zero (represented by −1 in the State Table FIG. 5).

8PSK Modulator Phase Diagram

As explained above and as shown in FIG. 2A signals entering phase conserving/inverting mixers 344A, 344B, 344C and 344D are offset relative to each other; i.e. the signal entering mixer 344A is 0 degrees, 344B is 90 degrees, 344C is 45 degrees and 344D is 135 degrees. So, for example, to transmit a three-bit symbol representing the three-bit symbol 010, modulator 18 would impose a phase shift of 157.5 degrees as shown at 360 in FIG. 5. As shown in the State Table of FIG. 5 this calls for an A drive signal of −1, a B drive signal of +1, a C drive signal of −1 and a D drive signal of +1. The −1 A-Drive signal causes inverter 344A to switch its 0 degree signal to 180 degrees; the +1 B-Drive signal causes inverter 344B to retain its 90 degree signal; the −1 C-Drive signal causes inverter 344C to switch its 45 degree (45 degrees plus 0 degrees) signal to 225 degrees and the +1 D Drive signal causes inverter 344D to retain its 135 degree (45 degrees plus 90 degrees) signal at 135 degrees. The net effect is a net shift of 157.5 degrees as shown by the dashed vector line 362 on the 8PSK Modulation Phase Diagram shown in FIG. 2B.

As explained above the millimeter wave signals exiting modulators 118 and 218 are amplified in amplifier 120 and 220 respectively and may be further amplified in an off chip amplifier 121 and 221. The amplified electrical signal is then directed to diplexer 122 and 222 where it is directed to antenna 140 and 240 where the amplified electrical is converted to a millimeter wave signal for transmission to the receiving transceiver at the other end of the radio link.

Receiver Circuits

The principal receiver circuits for Radio A and Radio B are shown in FIGS. 1A and 1B. Incoming millimeter wave signals at nominal frequencies of 73.5 GHz or 83.5 GHz are collected in antennas 140 and 240, separated in diplexer 122 and 222, amplified in low noise amplifier 124 and 224, filtered in band pass filter 125 and 225 to filter out out-of-band noise, and demodulated in demodulator 126 and 226 where they may drive a fiber-optic transmitter or other transmission medium to produce a 10.3125 Gbps on-off data output stream via a clock recovery circuit and a parallel-serial converter as shown at 105 and 205 in FIGS. 1A and 1B.

D8PSK Demodulator

Figure 6:
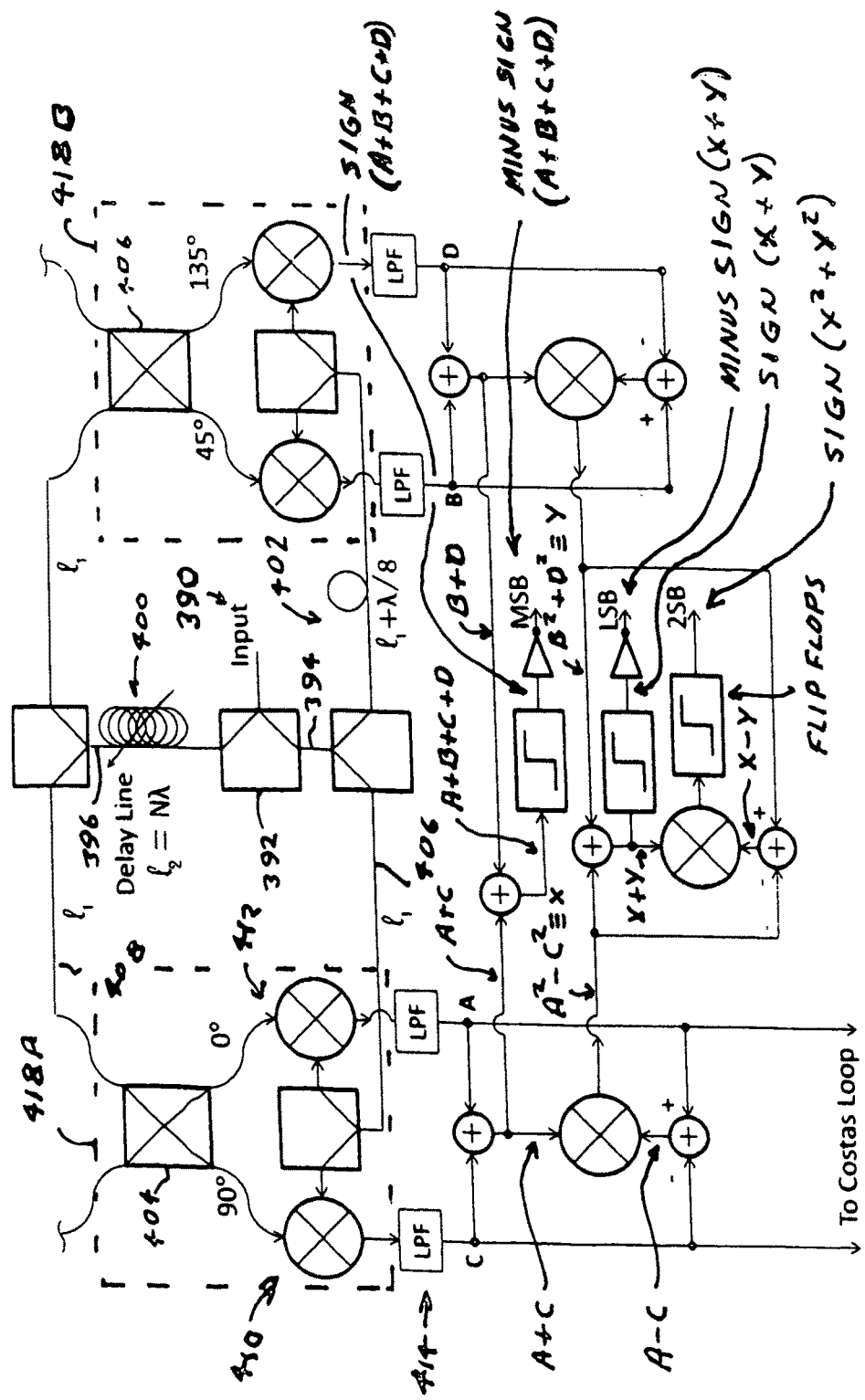
FIG. 6 is a demodulator circuit for preferred embodiments.
Figure 7:
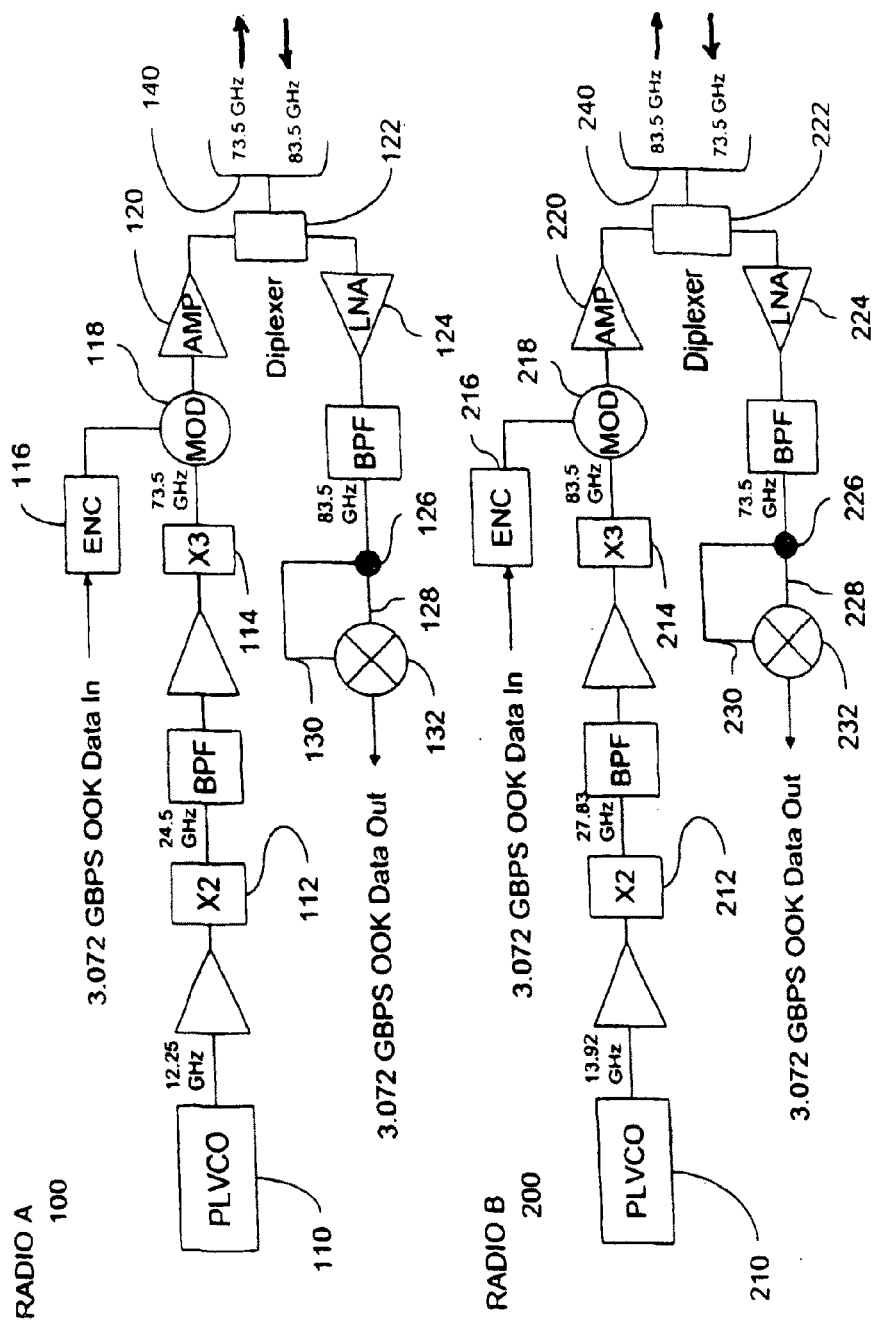
FIG. 7 is a drawing from the parent application showing features of the radios described therein.

Details of the demodulation circuits 126 and 226 are described in FIGS. 6 and 7. In these circuits the differential 8-state phase shift is detected and evaluated using a sequential state phase comparator, to reconstruct the most, second and least significant bits, MSB, 2SB, and LSB of each of the three-bit symbols at the rate of 3.4375 Gbps. As shown in FIG. 6, off-chip delay line 400 corresponding to an integral number of carrier wavelengths, matching as closely as possible the total phase change across one symbol period (291 ps), and a 45 degree delay line and a pair of 90 degree hybrids are used to compare the phase state of the current data symbol with the previous data symbol.

The current signal is input as shown at 390 and split in splitter 392 into a current state signal 394 and a previous state signal 396. One-half of the input signal 390 is directed through the delay line 400 (delay time matching integral wave periods closest to one 291 ps symbol period; i.e. 285.7 ps [exactly 21 periods] for a 73.5 GHz demodulator, and 287.4 ps [exactly 24 periods] for a 83.5 GHz demodulator) to create the previous signal 396. A second λ/8 (corresponding to 45 degrees) delay line 402 (this one is preferably on-chip) and a pair of IQ modulator circuits 418A and 418B (similar to circuits of Goteborg Microwave Integrated Circuits model MDR080A01) consisting of 90-degree hybrids 404 and 406, are used to offset the phase of the current signal from the preceding signal by zero, π/4, π/2 and 3π/4 radians (0 degrees, 45 degrees 90 degrees and 135 degrees). Signal splitters 424 and 426, and mixers 410, 412, 420 and 422) are used to mix the current and delayed signals with the aforementioned phase shifts into four output channels, A, B, C, and D. The preferred IQ modulator outputs each of these signals through a filter 414 on to differential line pairs (pair A and C and pair B and D) with very low noise. The demodulator is designed to be insensitive to the amplitudes of the intermediate mixing states, detecting the location and polarities of the unbalanced (±1, 0) and balanced (±√2/2, ±√2/2) output pairs of the IQ modulators to decode the three-bit data from the differential phase shift. The demodulator State Table corresponding to the FIG. 6 demodulator is shown in Table 1. In Table 1 entries of "s" represent nominal relative amplitudes of √2/2. Amplitudes of voltage signals at nodes marked A, B, C, D, X, Y, LSB, 2SB and MSB in FIG. 6 are tracked for each differential phase shift state and are utilized to determine the values of the three bits of each symbol, at the rate of 3.4375 billion symbols per second.

The long delay line 400 shown in FIG. 6 used in the sequential state comparator is approximately one symbol period (291 ps) long and chosen to match an exact number of wave periods of the carrier; for instance exactly 21 cycles of a carrier at 73.5 GHz and exactly 24 cycles of a carrier at 83.5 GHz. This corresponds to between 2 and 3 inches of stripline or microstrip transmission line, so in preferred embodiments this component is fabricated off chip. Stabilization of this path length can be accomplished, using an error signal from a Costas-type loop as described below to provide a small incremental feed-back correction path or alternatively by varying the mixer bias levels slightly to affect the required phase adjustment. The 45 degree increment of ambiguity in the 8PSK Costas-type loop is large compared to the delay length variation that can be expected from electrical or thermomechanical effects, so the delay line should be adequately stabilized in all conditions.

TABLE 1

| Phase Shift | Data | A | B | C | D | $X = A^2 - C^2$ | $Y = B^2 - D^2$ | $\text{sgn}(A + B + C + D) = \text{MSB}$ | $-\text{sgn}(X + Y) = 2\text{SB}$ | $\text{sgn}(Y^2 - X^2) = \text{LSB}$ |
|---|---|---|---|---|---|---|---|---|---|---|
| 0°   | 000 | 1  | s  | 0  | −s | 1  | 0  | −1 (0) | −1 (0) | −1 (0) |
| 45°  | 001 | s  | 1  | s  | 0  | 0  | 1  | −1 (0) | −1 (0) | 1 |
| 90°  | 010 | 0  | s  | 1  | s  | −1 | 0  | −1 (0) | 1 | −1 (0) |
| 135° | 011 | −s | 0  | s  | 1  | 0  | −1 | −1 (0) | 1 | 1 |
| 180° | 100 | −1 | −s | 0  | s  | 1  | 0  | 1 | −1 (0) | −1 (0) |
| 225° | 101 | −s | −1 | −s | 0  | 0  | 1  | 1 | −1 (0) | 1 |
| 270° | 110 | 0  | −s | −1 | −s | −1 | 0  | 1 | 1 | −1 (0) |
| 315° | 111 | s  | 0  | −s | −1 | 0  | −1 | 1 | 1 | 1 |

8PSK Costas Loop

Figure 6A:
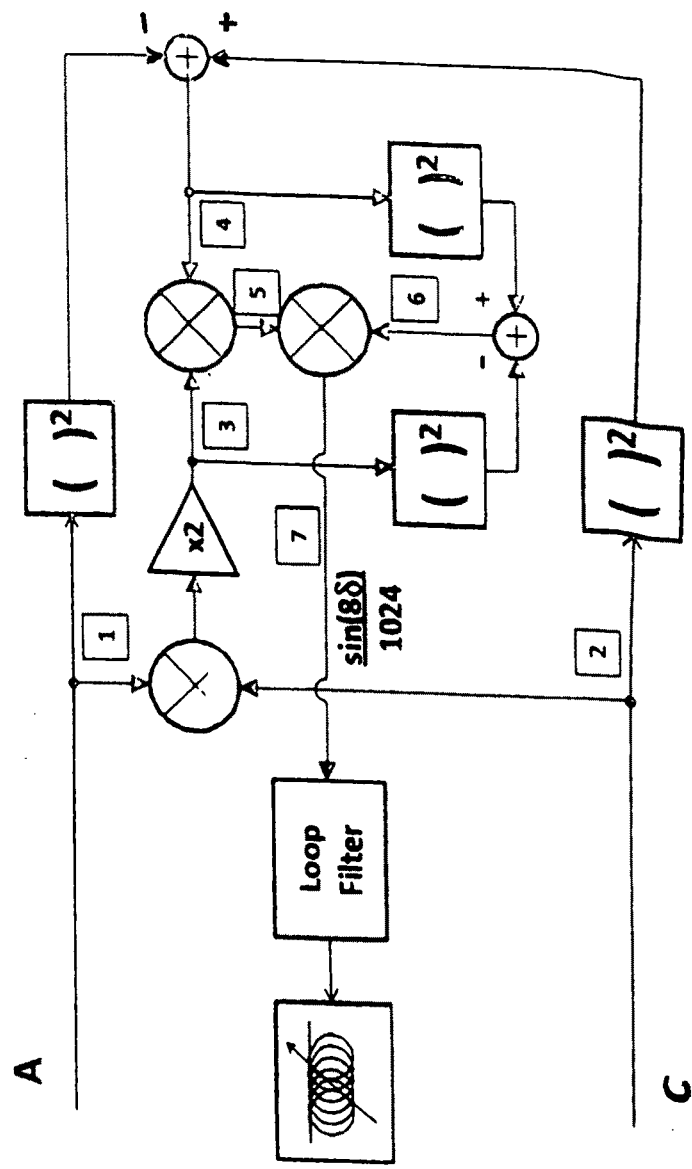
FIG. 6A shows features of an 8PSK Costas loop for stabilizing the FIG. 6 circuit.

These 8PSK Costas-type loops exists in prior art. The one designed for this preferred embodiment is shown in FIG. 6A. It is used in this preferred embodiment to stabilize the path delay as an exact integral number of wavelengths. The modulated communication waveform can be mathematically described as:

$$S = a\cos(\omega\tau) + b\cos\left(\omega\tau + \frac{\pi}{4}\right) + c\cos\left(\omega\tau + \frac{\pi}{2}\right) + d\cos\left(\omega\tau + \frac{3\pi}{4}\right),$$

where the eight defined 8PSK symbol states are represented by:

| Symbol | a | b | c | d |
|---|---|---|---|---|
| 000 | 1  | 0  | 0  | 0 |
| 001 | 0  | 1  | 0  | 0 |
| 010 | 0  | 0  | 1  | 0 |
| 011 | 0  | 0  | 0  | 1 |
| 100 | −1 | 0  | 0  | 0 |
| 101 | 0  | −1 | 0  | 0 |
| 110 | 0  | 0  | −1 | 0 |
| 111 | 0  | 0  | 0  | −1 |

In the receiver IQ modulator shown in FIG. 6, the received signal 406 is mixed with the reference signal 408 which has been delayed by an exact multiple of the carrier wave period plus some small error amount δ; the Costas loop is designed to minimize this error. After a short transient interval at the beginning of each symbol period (the difference between the symbol period of 290.9 ps and the delay line period of 285.7 or 287.4 ps), the two inputs to the mixer represent two successive bit phases offset by the encoded phase shift plus the small error amount. In order to minimize this error, the Costas loop uses as one input the modulated signal waveform corresponding to the present symbol state, and as the second input the delayed (previous) symbol state, defining the phase shift of the reference signal to be zero plus the small error:

$R = \cos(\omega t + \delta)$,

Multiplying the received signal by the reference signal into the A and C channels, with and without a π/2 phase shift respectively, and filtering the frequency doubled components, $$A = \frac{a}{2}\cos\delta + \frac{b}{2}\cos\left(\frac{\pi}{4} + \delta\right) + \frac{c}{2}\cos\left(\frac{\pi}{2} + \delta\right) + \frac{d}{2}\cos\left(\frac{3\pi}{2} + \delta\right)$$

$$= \frac{1}{2}\left[\cos\delta\left\{a + \frac{\sqrt{2}}{2}b - \frac{\sqrt{2}}{2}d\right\} - \sin\delta\left\{\frac{\sqrt{2}}{2}b + c + \frac{\sqrt{2}}{2}d\right\}\right]$$

$$= \frac{1}{2}[I\cos\delta - Q\sin\delta], \text{ [Node 1, shown in box in FIG. 6A]}$$

$$C = \frac{a}{2}\cos\left(\frac{\pi}{2} + \delta\right) + \frac{b}{2}\cos\left(\frac{3\pi}{4} + \delta\right) + \frac{c}{2}\cos(\pi + \delta) + \frac{d}{2}\cos\left(\frac{5\pi}{4} + \delta\right)$$

$$= -\frac{1}{2}\left[\cos\delta\left\{\frac{\sqrt{2}}{2}b + c + \frac{\sqrt{2}}{2}d\right\} + \sin\delta\left\{a + \frac{\sqrt{2}}{2}b - \frac{\sqrt{2}}{2}d\right\}\right]$$

$$= -\frac{1}{2}[Q\cos\delta + I\sin\delta], \text{ [Node 2, in FIG. 6A]}$$

where we have defined $$I \equiv a + \frac{\sqrt{2}}{2}b - \frac{\sqrt{2}}{2}d;$$

$$Q \equiv \frac{\sqrt{2}}{2}b + c + \frac{\sqrt{2}}{2}d.$$

Analyzing the 8PSK Costas loop, the mixers, amplifiers and summers in the loop create the products $2AC(C^2 - A^2)$ and $(C^2 - A^2)^2 - (2AC)^2$ and then mix (multiply) these to create the phase error signal. Evaluating these products:

$$2AC = \frac{1}{4}[(Q^2 - I^2)\sin 2\delta - 2IQ\cos 2\delta], \text{ [Node 3]}$$

$$C^2 - A^2 = \frac{1}{4}[(Q^2 - I^2)\cos 2\delta + 2IQ\sin 2\delta], \text{ [Node 4]}$$

$$2AC(C^2 - A^2) = \frac{1}{32}\left[\{(Q^2 - I^2)^2 - (2IQ)^2\}\sin 4\delta - 4IQ(Q^2 - I^2)\cos 4\delta\right]$$

$$= \frac{1}{32}[Z\sin 4\delta - W\cos 4\delta], \text{ [Node 5]}$$

$$(C^2 - A^2)^2 - (2AC)^2 = \frac{1}{16}\left[\{(Q^2 - I^2)^2 - (2IQ)^2\}\cos 4\delta + 4IQ(Q^2 - I^2)\sin 4\delta\right]$$

$$= \frac{1}{16}[Z\cos 4\delta - W\sin 4\delta], \text{ [Node 6]}$$

where we have defined $Z \equiv (Q^2 - I^2)^2 - (2IQ)^2; W \equiv 4IQ(Q^2 - I^2)$.

The error signal is derived from the product of these last two terms:

$$2AC(C^2 - A^2)[(C^2 - A^2)^2 - (2AC)^2] =$$
$$\frac{1}{1024}\{(Z^2 - W^2)\sin 8\delta - 2ZW\cos 8\delta\]. \quad [\text{Node 7}]$$

Evaluating this error signal for all eight 8PSK symbol states, the error signal is independent of the symbol state (and therefore is not modulated at the symbol rate):

| Symbol | a  | b  | c  | d  | I       | Q       | Z  | W | Node 7, Error Signal |
|--------|----|----|----|----|---------|---------|----|---|----------------------|
| 000    | 1  | 0  | 0  | 0  | 1       | 0       | 1  | 0 | sin(8δ)/1024         |
| 001    | 0  | 1  | 0  | 0  | √2/2    | √2/2    | -1 | 0 | sin(8δ)/1024         |
| 010    | 0  | 0  | 1  | 0  | 0       | 1       | 1  | 0 | sin(8δ)/1024         |
| 011    | 0  | 0  | 0  | 1  | -√2/2   | √2/2    | -1 | 0 | sin(8δ)/1024         |
| 100    | -1 | 0  | 0  | 0  | -1      | 0       | 1  | 0 | sin(8δ)/1024         |
| 101    | 0  | -1 | 0  | 0  | -√2/2   | -√2/2   | -1 | 0 | sin(8δ)/1024         |
| 110    | 0  | 0  | -1 | 0  | 0       | -1      | 1  | 0 | sin(8δ)/1024         |
| 111    | 0  | 0  | 0  | -1 | √2/2    | -√2/2   | -1 | 0 | sin(8δ)/1024         |

The output of each of demodulators 126 and 226 is three parallel on-off 3.4375 Gbps digital electrical signals representing the MSB, LSB and 2SB of an octal symbol on three separate parallel lines as shown in FIGS. 1A and 1B at 126A and 126B. These signals are converted from parallel to serial in converter circuits 127 and 227 which are clocked by clock recovery circuits 127A and 27A and time multiplier circuits 127B and 227B. The serial signal now a binary electrical signal at rates of 10.3125 Gbps which is converted in fiber converters 128 and 228 into optical signals for transmittal at 10.3125 Gbps out of the radios via an optical fiber.

Design Considerations

Need for Flat Gain and Constant Group Delay

For these radios broad modulation/demodulation bandwidths will be carried through heterodyne or super-heterodyne up/down-conversion to result in transmitter/receiver front-end bandwidths covering up to 5 GHz of millimeter-wave frequency. As a result, millimeter-wave radio frequency transmitter and receiver components should exhibit flat gain (3 dB gain window) and constant group delay (<50 ps) characteristics over a much broader bandwidth than the counterparts in the lower-frequency microwave radios. E-Band radio designs should feature amplifier and filter components with extremely low variation in group delay in order to faithfully preserve the superposition of spectral components that makes up a clean, bit-error free signal waveform (eye-diagram).

Need for Large Dynamic Range

Due to the severity of rain fade at E Band, the radio should operate over an expected dynamic range far in excess of a typical microwave radio to accommodate heavy rain events. The transmitter must have the capability for changing output power over a large dynamic range on command.

Transmitter Output Power

Ultimate output power is less important in E-Band radio than at lower frequencies, because rain fade quickly nullifies the benefits of a few dB of extra power even over a relatively short (approximately 1 km) link. Antenna gain is much higher at millimeter-wave—relative to microwave—for a given antenna size, so effective radiated power (ERP) is greatly enhanced by antennas of modest size, further reducing the importance of an expensive and reliability-limiting power amplifier in the transmitter. An optimal E-Band radio design will have a typical output power not exceeding 200 milliwatts, but with flat gain and phase characteristics across the full operating band of the radio (1 to 5 GHz) and allowing for a large dynamic range in output power. At frequencies above 70 GHz high humidity and heavy rainfall results in substantial increases in atmospheric attenuation, so any excess link margin at these frequencies is needed to cope with weather-related signal fade, rather than for increased modulation efficiency.

Need for Low Oscillator Phase Noise

The local oscillator used as a frequency source in the transmitter multiplier chain and/or heterodyne transmitter/receiver up-converters and down-converters should have extremely low phase noise (integrated double-sideband phase noise less than 1 degree at the microwave frequency of the oscillator; less than 5 degrees after frequency multiplications to E Band), in order to maintain an adequate spacing between phase states and thereby avoid oscillator-induced bit errors.

Need for Low Order Modulation

The strong atmospheric attenuation associated with rain events is accompanied by large temporal variations in the signal amplitude and phase received from a remote transmitter. This effect makes it difficult to distinguish small differences in amplitude and phase imposed by a modulator from those imposed by the atmosphere, leading to high bit error rates from radios using high-order modulation schemes. The most robust modulation schemes are on-off keying and binary phase shift keying (OOK and BPSK), which require at least 1 Hz of bandwidth for each bit-per-second of data throughput. This modulation efficiency is acceptable for E-Band radios supporting up to at least 3.072 Gbps of data throughput (OBSAI protocols). For radios supporting 10-Gigabit Ethernet (10 Gig-E), the modulation efficiency must exceed 2 bits per second per Hz (e.g. 8PSK at 3 bits per second per Hz), but any higher order modulation schemes, typical of microwave radios, will be detrimental to radio performance.

Need for Amplitude-Insensitive Demodulator

The need for large power margin to accommodate rain events will often require the E-Band transmitter to transmit into the compression region of the output power amplifier. The symbol demodulator must be designed to be insensitive to amplitude, relying only on a power threshold and the polarity of the demodulated signals, so that the transmitter power amplifier may be pushed into compression during heavy rain events without significant degradation of symbol discrimination (bit error rate).

Output Power and Spectrum Gain Control

For this preferred embodiment shown in FIG. 1 operating at data rates of the 10.3125 Gbps the occupied transmit bandwidth is between 3.5 GHz and 5 GHz. The transceiver is designed to provide a power spectral density, over more than 70 percent of occupied bandwidth of the transmitter which is constant to within +/−1.5 dB and the transceiver provides a dynamic range in power output exceeding 15 dB.

Comparison with Prior Art Chipset Radios

As explained in the background section recent advances in semiconductor technology have enabled the fabrication of increasingly complex mixed-signal (analog/digital) circuitry on a single integrated circuit chip or a chipset containing a minimal number of chips. Such circuitry has included analog microwave and millimeter-wave front-end amplifiers, filters, oscillators, and mixer/down-converters, as well as intermediate-frequency electronics, phase-lock loops, power control and back-end analog baseband circuitry, along with digital modulators and de-modulators, clock recovery circuits, forward error correction and other digital data management functions. Mixed-signal integrated chip solutions for wireless communications have universally evolved from RF frequencies below 1 GHz (e.g. 900 MHz handsets for wireless telephone in the home) to low microwave frequencies (analog/digital cell phone technology with carrier frequencies up to 2 GHz), to high microwave and low millimeter-wave frequencies (6 to 38 GHz) for wireless point-to-point broadband communications. Most recently, radio receivers and transmitters have been demonstrated using single-chip circuits at frequencies in the license-free band spanning 57 to 64 GHz. At these transmit frequencies the radios operate at very short distances due to the absorption of the radio beam by oxygen in air. These circuits have been based on techniques that have been successful to lower frequency radios. For example, these prior art radio-on-a-chip designs have featured heterodyne and super-heterodyne circuits with relatively narrow (<1 GHz) baseband frequency channels for modulation and demodulation, because the symbol rate was constrained far below 1 billion symbols per second by the channel bandwidth available for microwave radios. Embodiments of the present invention are designed to utilize the entire available bandwidth, greater than 1 GHz, for modulation and demodulation. Optimal designs for Applicants' radio chips will utilize baseband modulation bandwidths of 1 to 5 GHz to make use of the preferential rules including E-Band rules allowing occupation of up to 5 GHz of contiguous spectrum per half-duplex radio path.

Variations

Although preferred embodiments of the present invention have been described in detail above, persons skilled in the radio art will recognize that many variations are possible within the scope of the present invention. Some variations are listed below.

Other High Data Rate Millimeter Radios

Applicant has described a preferred embodiment of a radio supporting a data rate of 10 Gbps using a differential octal phase shift keyed (D8PSK) modulator; however the radio on a chip or minimal chipset should not be considered to be bound by this data rate or modulation approach. Indeed at lower data rates, more robust modulation approaches such as DBPSK or DQPSK may be employed and would allow for bit-error-free operation at lower link margins.

A popular data transfer standard supported by one radio sold by Applicant is the Gigabit-Ethernet (GigE) standard which exchanges data at a rate of 1.25 Gbps. At this rate, and for data rates up to about 3.5 Gbps, the preferred modulation scheme is Differential Binary Phase Shift Keying (DBPSK), where the difference between phase states (180 degrees) is four times larger than for D8PSK (45 degrees), and consequently a lower signal-to-noise ratio is required to distinguish between phase states. The DBPSK design is described in parent application Ser. No. 12/928,017 which has been incorporated herein by reference. FIG. 7 is a circuit drawing based on conventional circuitry. In accordance with the present invention these circuits would be fabricated on a single chip or chipset utilizing well known integrated circuitry fabrication techniques as explained above with respect to the first preferred embodiment. Beyond data rates of 3.5 Gpbs, the Federal Communication Commission allocated channel bandwidth becomes insufficient to support the modulation rates, and it becomes necessary to transmit data "symbols" representing more than one data bit at a time. For radios supporting data transfer rates between 3.5 Gbps and about 7 Gbps, the preferred modulation approach is Differential Quadrature Phase Shift Keying (DQPSK), in which two bits of data are sent simultaneously within each "symbol," and the spacing between the four possible symbol phase states is 90 degrees. For radios supporting data rates between 7 Gbps and about 10.5 Gbps, the preferred modulation approach is Differential Octal Phase Shift Keying (D8PSK), in which three bits of data are sent simultaneously, as described in the first preferred embodiment for this patent. For radios supporting even higher data rates the modulation scheme is chosen to send four or more bits of data simultaneously, and the link margin (or signal-to-noise ratio) required to maintain error-free transmission becomes successively higher. Chip-based radio transceivers designed for a range of data transfer rates less than the threshold rates of 3.5 Gbps, will preferably include modulator/demodulators of the DBPSK types. For data rates above 3.5 Gbps and below 7.0 Gbps DQPSK is preferred. And for rates above 7.0 and 10.5 D8PSK is preferred.

Silicon-Germanium Semiconductors

The components of the millimeter wave radios described above are in general state of the art millimeter wave and optical fiber components. However, many of the components could be fabricated together on one or more semiconductor substrates to produce very low cost millimeter wave radios. Silicon-germanium bipolar transistors on complementary metal-oxide-semiconductor (referred to as "SiGe BiCMOS") technology, which marries the superior low-noise and high-speed properties of the SiGe heterojunction bipolar transistors with the low cost and manufacturability advantages of conventional CMOS technology, represent an ideal solution for mixed-signal applications such as millimeter-wave wireless communications systems, in which frequency sources and multipliers, mixers and low-noise amplifiers are used alongside digital modulator control and processing circuitry. Amplifiers using SiGe bipolar transistors are more efficient and achieve lower noise figures than comparable conventional CMOS amplifiers, and the higher breakdown voltage of SiGe allows for higher device output power as well.

High Frequency Radio Components on Si and SiGe

Gallium Arsenide (GaAs) is superior to SiGe semiconductors for ultra-low phase noise high-frequency oscillators (so an external microwave phase-locked voltage-controlled oscillator (PLVCO) is a preferred frequency source), but the frequency multiplier chain, upconversion and downconversion mixers and millimeter-wave, microwave and baseband amplifiers can all be implemented satisfactorily using conventional microstrip circuitry on Si and SiGe semiconductor substrates. For lowest cost, a silicon wafer can be used as a substrate, with germanium placed locally on the chip at the locations of the millimeter-wave transistors and diodes, so that the more expensive SiGe material is localized only in the regions of the high-frequency MMW and microwave semiconductor junctions. Lower frequency circuitry, including the data encoder, high-speed driving logic and all other baseband and digital data and control electronics may be implemented using standard CMOS processes on the same silicon substrate. The data decoder and delay-stabilizing Costas loop can be implemented on the receiver chip, but due to its physical size the longer symbol-period delay line is best implemented off-chip, using a microstrip line on a flex-circuit material such as Rogers 3003 or using a waveguide delay line. A SiGe foundry, such as the IBM foundry located near Essex Junction, Vt., with a 0.13-micron or 0.09-micron SiGe process can produce SiGe chips of the preferred design for 10 Gbps E-Band radio transceivers.

Other Variations

Figure 8A:
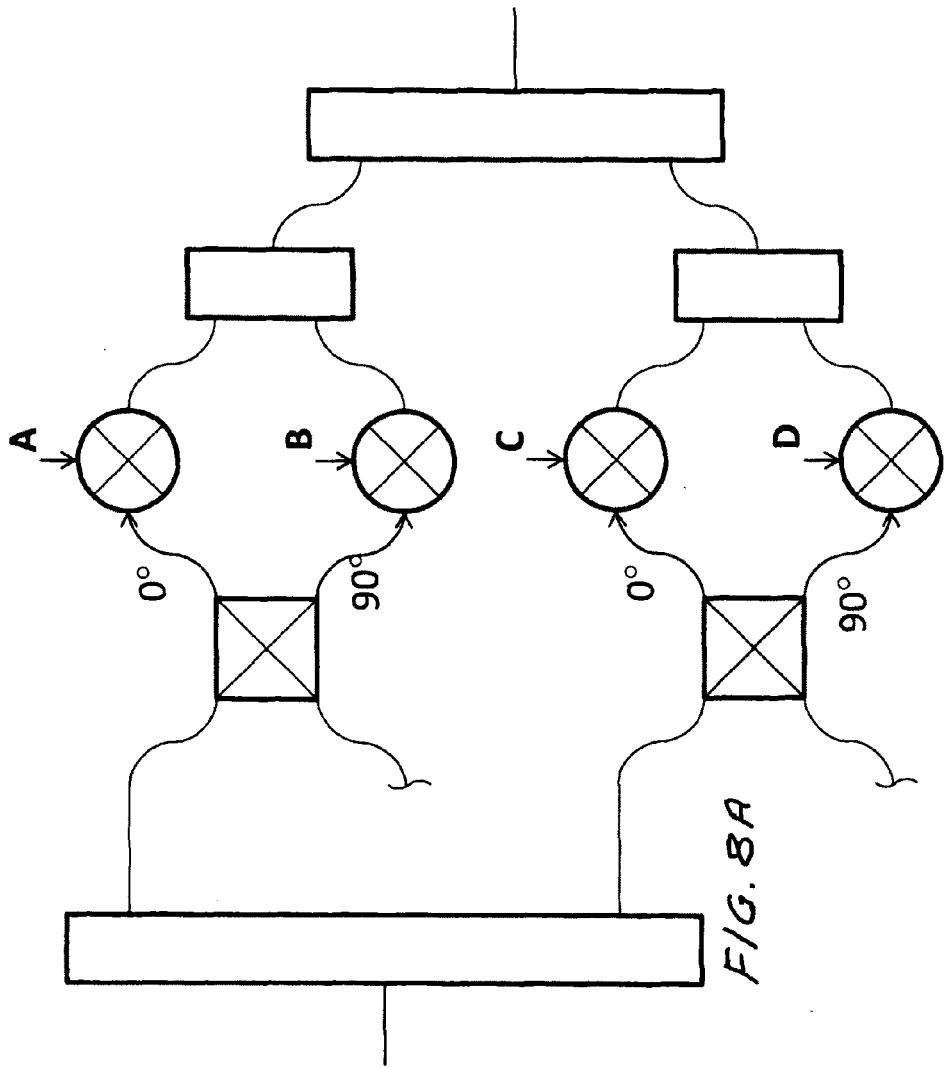
FIGS. 8A and 8B show features of an embodiment where the 45 degree delay line 350 shown in FIG. 1A is omitted.
Figure 8B:
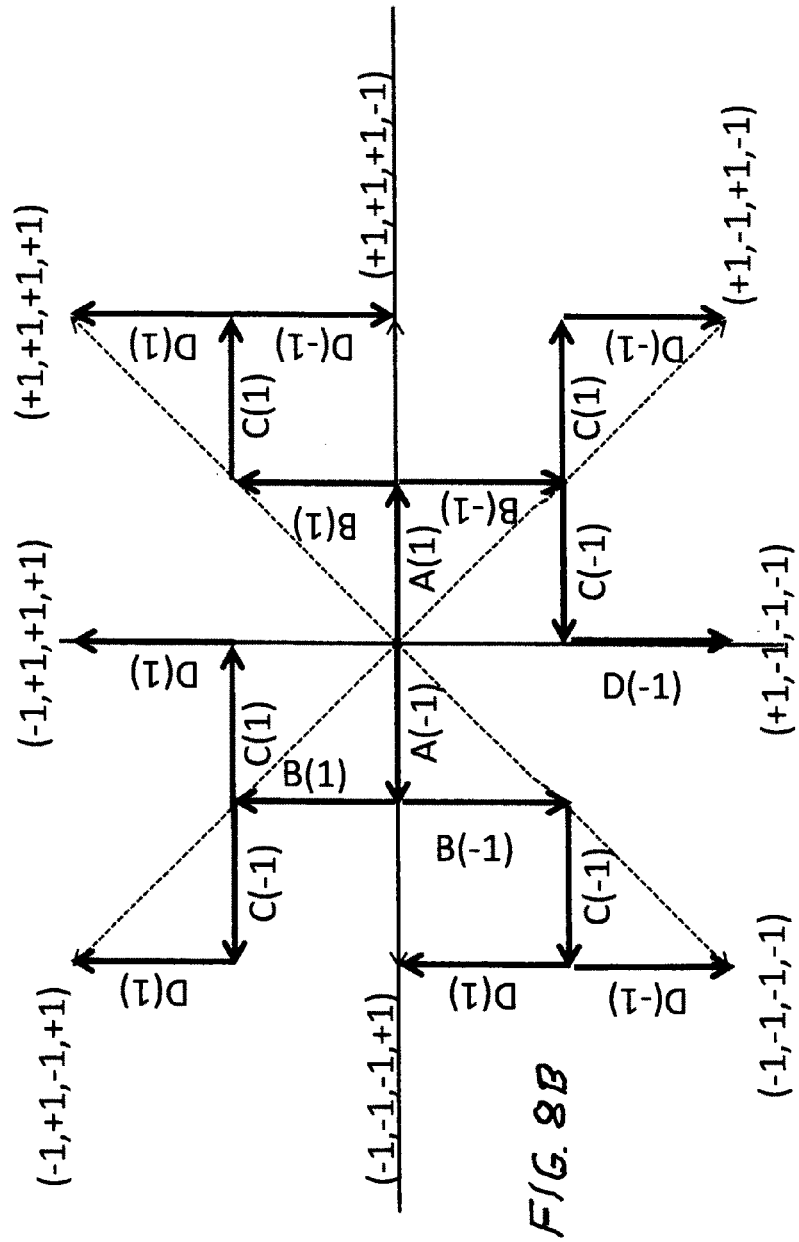

FIGS. 8A and 8C show features of a variation where the 45 degree delay line 350 shown in FIG. 1A is omitted.

The radio described in this patent is capable of delivering data rates in excess of 3.5 Gigabits per second, a speed which is unprecedented for any form of wireless communications at the time of this invention. The preferred embodiment in this description operates under the Internet Protocol (IP) Ethernet Standard at 10 Gigabits per second with a small amount of overhead for ensuring bit toggling at some minimum speed. There are, however, many other communications standards which involve serial transfer of binary data at speeds in excess of 3.5 Gigabits per second and within the maximum bandwidth capability of this radio. Some of these include:

SONET OC-96 (4.976 Gbps)
4xGig-E (5.00 Gbps)
5xGig-E (6.25 Gbps)
OBSAI RP3-01 (6.144 Gbps)
6xGig-E (7.50 Gbps)
Fibre Channel 8GFC (8.5 Gbps)
SONET OC-192 (9.952 Gbps)
Fibre Channel 10GFC Serial (10.52 Gbps)

The High Data Rate Wireless Communications Radio described in this patent will support all of these protocols and a variety of others, up to a maximum data rate of about 13 Gbps. In preferred embodiments operating at data rates in the range of about 3.5 Gbps the occupied transmit bandwidth should be between 1.0 GHz and 5 GHz. For the higher data rates the transmit bandwidth will preferably be in a range closer to the 5 GHz limit Therefore readers should determine the scope of the present invention by reference to the appended claims.

What is claimed is:

1. A high data rate, phase shift keying, millimeter wave radio, single chip or chipset transceiver system comprising:
   A) transmitter circuitry, all of which or mostly all of which are fabricated on a single chip or chipset, adapted to receive an binary input data stream at input data rates of about 10.3125 Gbps and to transmit at output data rates of about 10.3125 Gbps utilizing phase shift keying of a millimeter wave carrier signal having a frequency in excess of 50 GHz, said transmitter circuitry comprising:
      1) a millimeter wave circuitry adapted to produce a millimeter wave carrier signal at frequencies in excess of 50 GHz;
      2) encoding circuitry adapted to encode input binary signals to produce an encoded signal said circuitry comprising:
         a) a serial-to-parallel converter circuitry adapted to produce three bit symbols represented by three separate parallel signals,
         b) D8PSK adder circuitry adapted to generate eight phase shift control bits from the input binary signal and to output three signals representing a most significant bit, a second most significant bit and a least significant bit of an eight-bit binary number and
         c) drive logic circuitry adapted to generate four drive signals; and 3) an optical phase shift keying (8PSK) modulator:
         a) adapted to apply said encoded signal to said phase shift keying of the millimeter wave carrier signal to produce a modulated carrier signal, and
         b) adapted to produce eight-bit symbols at the rate of about 3.4375 billion symbols per second,
   B) receiver circuitry, all of which or mostly all of which are fabricated on a single chip or chipset, adapted to receive an incoming signal transmitted from a millimeter wave transmitter, said receiver circuitry comprising:
      1) millimeter wave amplifier circuitry adapted to amplify said incoming millimeter wave signal;
      2) demodulation circuitry comprised of a sequential state comparator adapted to reconstruct the most significant bit, the second most significant bit and the least significant bit of the eight-bit binary number and adapted to demodulate the incoming millimeter wave signal to produce a binary output data stream, wherein the demodulator circuitry also includes:
         a) a first receiver splitter adapted to split said incoming millimeter wave signal into a two signal streams, one of said two signal streams defining a current symbol state,
         b) a delay means to delay the other of said two signal streams by a time period equal to an exact integral number of wave periods as close as possible to the communication symbol rate to define a previous symbol state,
         c) a second receiver splitter adapted to split said current symbol state into two current signal streams, one of said two current signal streams defining a split current symbol state,
         d) a second delay means adapted to delay the other of said two current signal streams by a time period equal to one eighth of the period of said nominal millimeter wave carrier frequency to define a 45 degree shifted current symbol state,
         e) a third receiver splitter adapted to split the said previous symbol state into two approximately equal previous signal streams,
         f) a pair of integrated quadrature demodulators adapted to shift the two approximately equal previous symbol state signal streams into four separate signal streams separated in phase from each other to define four previous signal streams defining two un-shifted previous symbol state streams and two 90-degree-shifted previous symbol state streams,
         g) a fourth receiver splitter adapted to split the split current signal stream into two current signal streams and another third-level receiver adapted to split the 45 degree delayed current signal stream into two 45 degree delayed current signal streams,
         h) four mixers, one of which is adapted to mix one of the two current symbol state streams with the 90-degree-shifted previous symbol state stream, one of which is adapted to mix the other of the two current symbol state streams with the un-shifted previous symbol state stream, one of which is adapted to mix one of the two 45-degree-shifted current symbol state streams with the un-shifted previous symbol state stream, and one of which is adapted to mix one of the two 45-degree-shifted current symbol state streams with the 90-degree-shifted previous symbol state stream, to define four integrated quadrature output signals defining output signals, C, A, B and D, i) integrated circuitry comprised of mixers, flip flops and inverters adapted to combine the output signals C, A, B, and D to produce an output data stream of binary data at data rates exceeding 3.5Gbps;

C) an antenna system adapted to:
1) convert said modulated carrier signal to a millimeter wave beam having a beam width of less than two degrees and to direct the beam to another transceiver and
2) receive a millimeter wave beam transmitted by said another transceiver and convert said millimeter wave beam into the incoming signal.

2. The transceiver as in claim 1 wherein the millimeter wave circuitry includes a frequency stabilized signal source, the data rates of the input data stream and the output data rates are in excess of 1.0 Gbps and the receiver circuitry is adapted to receive the incoming signals at frequencies in excess of 70 GHz and data rates in excess of 1.0 Gbps.

3. The transceiver system as in claim 1 wherein at least a portion of said single chip or chipset is comprised of silicon germanium.

4. The transceiver system as in claim 1 wherein at least a portion of said single chip or chipset is comprised of gallium arsenide.

5. The transceiver system as in claim 1 wherein at least portions of the transmitter circuitry and the receiver circuitry are fabricated on the same single chip or chipset.

6. The high data rate transceiver as in claim 1 wherein the nominal transmitter carrier frequency is between 71 and 76 GHz.

7. The high data rate transceiver as in claim 1 wherein the nominal transmitter carrier frequency is between 81 and 86 GHz.

8. The high data rate transceiver as in claim 1 wherein the radio is adapted to operate in accordance with the 10 Gigabit Ethernet standard.

9. The transceiver as in claim 1 wherein the radio is adapted to operate in accordance with a protocol or standard chosen from the following group of protocols or standards:

SONET OC-96 (4.976 Gbps)
4xGig-E (5.00 Gbps)
5xGig-E (6.25 Gbps)
OBSAI RP3-01 (6.144 Gbps)
6xGig-E (7.50 Gbps)
Fibre Channel 8 GFC (8.5 Gbps)
SONET OC-192 (9.952 Gbps)
Fibre Channel 10GFC Serial (10.52 Gbps).

10. The transceiver as in claim 1 wherein the transmitter and the receiver portions of the transceiver are contained in a single enclosure.

11. The transceiver as in claim 1 wherein the transmitter and the receiver portions of the transceiver are contained in separate enclosures.

12. The transceiver as in claim 1 wherein the transmitter and the receiver transmit and receive through a single antenna.

13. The high data rate transceiver as in claim 1 wherein the transmitter and the receiver transmit and receive through separate antennas.

14. The transceiver as in claim 1 wherein the transmitter defines an occupied transmit bandwidth and the occupied transmit bandwidth is in excess of 1.5GHz and less than 5 GHz.

15. The transceiver as in claim 1 wherein the transmitter defines an occupied transmit bandwidth and the occupied transmit bandwidth is in excess of 3.5 GHz and less than 5 GHz.

16. The transceiver as in claim 1 wherein the power spectrum density within more than 70 percent of the occupied bandwidth of the transmitter is constant to within +/−1.5 dB.

17. The transceiver of claim 1 wherein the power spectrum density within more than 70 percent of the occupied bandwidth of the transmitter is constant to within +/−1.5 dB.

18. The transceiver as in claim 1 wherein the transmitter is adapted to provide a dynamic range in power output exceeding 15 dB.

19. The transceiver as in claim 1 wherein the transmitter is adapted to provide a dynamic range in power output exceeding 15 dB.

* * * * *